(12) United States Patent
Igari et al.

(10) Patent No.: US 11,234,469 B2
(45) Date of Patent: Feb. 1, 2022

(54) DIP-FORMED ARTICLE AND PROTECTIVE GLOVE

(71) Applicant: ZEON CORPORATION, Tokyo (JP)

(72) Inventors: Naohiro Igari, Tokyo (JP); Shinji Kato, Tokyo (JP); Tetsuya Akabane, Tokyo (JP); Tomoya Taniyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 66 days.

(21) Appl. No.: 15/738,040

(22) PCT Filed: Jun. 30, 2016

(86) PCT No.: PCT/JP2016/069389
§ 371 (c)(1),
(2) Date: Dec. 19, 2017

(87) PCT Pub. No.: WO2017/010297
PCT Pub. Date: Jan. 19, 2017

(65) Prior Publication Data
US 2018/0303173 A1    Oct. 25, 2018

(30) Foreign Application Priority Data

Jul. 16, 2015    (JP) .............................. JP2015-142098

(51) Int. Cl.
*A41D 19/00*    (2006.01)
*B29C 41/14*    (2006.01)
(Continued)

(52) U.S. Cl.
CPC ..... *A41D 19/0065* (2013.01); *A41D 19/0006* (2013.01); *B29C 41/14* (2013.01);
(Continued)

(58) Field of Classification Search
CPC ............ A41D 19/0065; A41D 19/0006; A41D 2500/54; A41D 2600/20; B29C 41/14;
(Continued)

(56) References Cited

U.S. PATENT DOCUMENTS 2,060,961 A    11/1936  Tillotson
2,968,575 A *   1/1961  Mallonee ........... C08G 18/0866
                                                524/839
(Continued)

FOREIGN PATENT DOCUMENTS

JP    S60-239504 A    11/1985
JP    S61-275406 A    12/1986
(Continued)

OTHER PUBLICATIONS https://patents.google.com/patent/JP2001081614A/en?oq= 15738040 (Year: 1999).*
(Continued)

*Primary Examiner* — Arti Singh-Pandey
(74) *Attorney, Agent, or Firm* — Oliff PLC

(57) ABSTRACT

A dip-formed article includes a laminate in which a rubber layer is laminated on a fiber base material. The thickness of the rubber layer is 0.2 to 0.8 mm, the rubber constituting the rubber layer penetrates into the fiber base material, the maximum depth to which the rubber has penetrated into the fiber base material is 0.1 to 0.3 mm, and the maximum stress at 50% elongation of the laminate is 20 N or smaller.

7 Claims, 1 Drawing Sheet

(51) Int. Cl.
  *B29C 41/20* (2006.01)
  *B29K 105/08* (2006.01)
  *B29L 31/48* (2006.01)
  *B29D 99/00* (2010.01)

(52) U.S. Cl.
  CPC .......... *B29C 41/20* (2013.01); *A41D 2500/54* (2013.01); *A41D 2600/20* (2013.01); *B29D 99/0067* (2013.01); *B29K 2105/0809* (2013.01); *B29L 2031/4864* (2013.01)

(58) Field of Classification Search
  CPC ............... B29C 41/20; B29D 99/0067; B29K 2105/0809; B29L 2031/4864
  See application file for complete search history.

(56) References Cited

U.S. PATENT DOCUMENTS

| | | | |
|---|---|---|---|
| 3,026,531 | A | 3/1962 | Holaday |
| 3,642,966 | A * | 2/1972 | Morrissey et al. ..... B29C 67/20 264/46.4 |
| 4,156,753 | A | 5/1979 | Tanaka |
| 5,024,594 | A * | 6/1991 | Athayde ................ A62B 17/00 442/67 |
| 10,414,112 | B2 * | 9/2019 | Lipinski .................. B29C 33/58 |
| 2006/0150300 | A1 * | 7/2006 | Hassan ............... A41D 19/0058 2/161.6 |
| 2006/0257674 | A1 | 11/2006 | Lipinski et al. |
| 2007/0083980 | A1 * | 4/2007 | Yang ................. A41D 19/0006 2/167 |
| 2009/0077713 | A1 * | 3/2009 | Saunders ........... A41D 19/0096 2/161.7 |
| 2011/0191936 | A1 * | 8/2011 | Lipinski ............. A41D 19/0062 2/161.7 |
| 2013/0074242 | A1 * | 3/2013 | Moreland ........ A41D 19/01517 2/163 |
| 2015/0033801 | A1 | 2/2015 | Finzelberg |

FOREIGN PATENT DOCUMENTS

| | | |
|---|---|---|
| JP | S63-145817 U | 9/1988 |
| JP | H02-242968 A | 9/1990 |
| JP | H06-49702 A | 2/1994 |
| JP | H09-324311 A | 12/1997 |
| JP | H11-229818 A | 8/1999 |
| JP | H11-279818 A | 10/1999 |
| JP | H11-302911 A | 11/1999 |
| JP | 2000-096322 A | 4/2000 |
| JP | 2001-081614 A | 3/2001 |
| JP | 2001-131814 A | 5/2001 |
| JP | 2003-268612 A | 9/2003 |
| JP | 2004-107813 A | 4/2004 |
| JP | 2004-162222 A | 6/2004 |
| JP | 2011-045707 A | 3/2011 |
| JP | 2014-88643 A | 5/2014 |

OTHER PUBLICATIONS https://patents.google.com/patent/JP2001131814A/en?oq=15738040 (Year: 1999).*
Sep. 27, 2016 Search Report issued in International Patent Application No. PCT/JP2016/069389.
Jan. 16, 2018 International Preliminary Report on Patentability issued in International Patent Application No. PCT/JP2016/069389.
Feb. 19, 2019 Extended Search Report issued in European Patent Application No. 16824277.4.
Jul. 25, 2019 Office Action issued in Sri Lanka Patent Application No. 19682.
Jan. 14, 2020 Office Action issued in Indian Patent Application No. 201817001605.
Jul. 16, 2021 Office Action issued in European Patent Application No. 16 824 277.4.
Jul. 10, 2020 Office Action issued Chinese Patent Application No. 201680039366.7.
Jul. 16, 2020 Office Action issued European Patent Application No. 16824277.4.
Liu Da-hua et al., A Comprehensive Handbook of Synthetic Rubber Technology. Chemical Industry Press, Dec. 1991, pp. 1201.

* cited by examiner

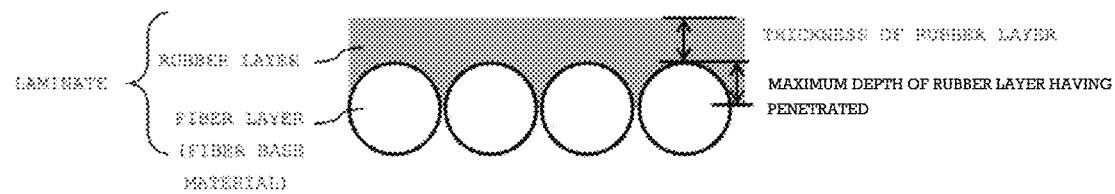

DIP-FORMED ARTICLE AND PROTECTIVE GLOVE

TECHNICAL FIELD

The present invention relates to a dip-formed article. More specifically, the present invention relates to a dip-formed article suitable for use in a protective glove or the like. The present invention also relates to a protective glove made by using the above-mentioned dip-formed article.

BACKGROUND ART

Conventionally, protective gloves produced by coating fiber gloves with rubber, resin or the like are used as working gloves in various applications such as factory manufacturing work, light work, construction work, and agricultural work. Such a working glove is required, for example, to have waterproofness, chemical resistance, workability, and the like. Patent Literature 1 discloses a working glove produced by coating a fiber glove with a plurality of layers of coating films and thus having permeation resistance to sulfuric acid.

CITATION LIST

Patent Literature

Patent Literature 1: JP 2014-88643 A

SUMMARY OF INVENTION

Technical Problem

Incidentally, when such a working glove is used in an environment in which the working glove comes into contact with a solvent, it is necessary to prevent the coating films from peeling from the fiber glove, to suppress fatigue during working, and to reduce the risk of permeation of a solvent gas at the time of wearing.

An object of the present invention is to provide a dip-formed article which can suppress peeling of a rubber layer from a fiber base material, can suppress fatigue during working, and can suppress the risk of permeation of a solvent gas at the time of wearing, and a protective glove produced from this dip-formed article.

Solution to Problem

As a result of intensive studies, the present inventors have found that the above-mentioned object can be achieved by setting the depth of rubber to which the rubber penetrates into a fiber base material to a predetermined value, thus completing the present invention.

That is, the present invention provides:

(1) a dip-formed article including a laminate in which a rubber layer is laminated on a fiber base material, in which a thickness of the rubber layer is 0.2 to 0.8 mm, rubber constituting the rubber layer penetrates into the fiber base material, a maximum depth of the rubber penetrated into the fiber base material is 0.1 to 0.3 mm, and a maximum stress at 50% elongation of the laminate is 20 N or smaller;

(2) the dip-formed article according to (1), wherein the rubber layer has no crack;

(3) the dip-formed article according to (1) or (2), wherein the rubber layer includes nitrile rubber; and (4) a protective glove using the dip-formed article according to any one of (1) to (3).

Advantageous Effects of Invention

According to the present invention, a dip-formed article which can suppress peeling of a rubber layer from a fiber base material, can suppress fatigue during working, and can suppress the risk of permeation of a solvent gas at the time of wearing, and a protective glove produced from this dip-formed article are provided.

BRIEF DESCRIPTION OF DRAWINGS

FIG. 1 is a schematic diagram showing a method of measuring the thickness of a rubber layer and the maximum depth of rubber having penetrated into a fiber base material.

DESCRIPTION OF EMBODIMENTS

Hereinafter, a dip-formed article of the present invention will be described. The dip-formed article of the present invention is a dip-formed article including a laminate in which a rubber layer is laminated on a fiber base material. The thickness of the rubber layer is 0.2 to 0.8 mm, the rubber constituting the rubber layer penetrates into the fiber base material, the maximum depth to which the rubber has penetrated into the fiber base material is 0.1 to 0.3 mm, and the maximum stress at 50% elongation of the laminate is 20 N or smaller.

(Laminate)

The dip-formed article of the present invention includes a laminate in which a rubber layer is laminated on a fiber base material. Note that, the laminate may be formed on a part or entirety of the dip-formed article.

(Fiber Base Material)

The fiber base material used for the dip-formed article of the present invention is not particularly limited as long as the fiber base material is made of fiber. As the material of the fiber, natural fibers such as cotton, hair, hemp, and wool, and synthetic fibers such as polyester, polyurethane, acryl, and nylon can be used. Among these, nylon is preferably used. In addition, the fiber base material may be knitted fabric, sewn fabric, woven fabric, or nonwoven fabric.

The thickness of the fiber base material is not particularly limited, but is preferably 0.1 to 2.0 mm. The linear density of the fiber base material is not particularly limited, but is preferably 50 to 500 denier. The gauge number of the fiber base material is not particularly limited, but is preferably 7 to 18 gauge. Here, the gauge number refers to the number of needles of a knitting machine provided in 1 inch.

(Rubber Layer)

The rubber layer is laminated on the fiber base material. The rubber constituting the rubber layer is not particularly limited, but natural rubber, nitrile rubber, chloroprene rubber, styrene-butadiene rubber, and so forth can be used. Among these, nitrile rubber is preferably used.

Nitrile rubber is a rubber obtained by copolymerizing an α, β-ethylenically unsaturated nitrile monomer and, if necessary, another copolymerizable monomer.

As the α, β-ethylenically unsaturated nitrile monomer, an ethylenically unsaturated compound including a nitrile group and having 3 to 18 carbon atoms is used. Examples of such a compound include acrylonitrile, methacrylonitrile, and halogen substituted acrylonitrile. These can be used alone or in combination of two or more. Among these, acrylonitrile is preferably used.

The content of α, β-ethylenically unsaturated nitrile monomer units is preferably from 10 to 45% by weight, and more preferably from 20 to 40% by weight with respect to the total monomer units. By setting the content of the α, β-ethylenically unsaturated nitrile monomer units to the upper limit or less, solvent resistance of the dip-formed article can be improved. By setting the content of the α, β-ethylenically unsaturated nitrile monomer units to the lower limit or more, the texture of the dip-formed article can be improved.

In addition, the nitrile rubber used in the present invention preferably contains a conjugated diene monomer unit so that a resulting rubber layer has rubber elasticity.

Preferable examples of a conjugated diene monomer constituting the conjugated diene monomer unit include conjugated diene monomers having 4 to 6 carbon atoms such as 1,3-butadiene, isoprene, 2,3-dimethyl-1,3-butadiene, 1,3-pentadiene, and chloroprene. Among these, 1,3-butadiene and isoprene are more preferable, and 1,3-butadiene is particularly preferable. The conjugated diene monomer may be used alone or in combination of two or more kinds.

The content of conjugated diene monomer units is preferably 40 to 80% by weight, and more preferably 52 to 78% by weight with respect to the total monomer units. By setting the content of the conjugated diene monomer units to the lower limit or more, the texture of the dip-formed article can be improved, and by setting the content to the upper limit or less, the solvent resistance of the dip-formed article can be improved.

In addition, the nitrile rubber may contain an ethylenically unsaturated acid monomer that can be copolymerized with a monomer that forms an α, β-ethylenically unsaturated nitrile monomer unit or a conjugated diene monomer unit.

The ethylenically unsaturated acid monomer is not particularly limited, but examples thereof include a carboxyl group-containing ethylenically unsaturated monomer, a sulfonic acid group-containing ethylenically unsaturated monomer, and a phosphate group-containing ethylenically unsaturated monomer.

Examples of the carboxyl group-containing ethylenically unsaturated monomer include ethylenically unsaturated monocarboxylic acids such as acrylic acid, methacrylic acid, crotonic acid; ethylenically unsaturated polyvalent carboxylic acids and anhydrides thereof such as fumaric acid, maleic acid, itaconic acid, maleic anhydride, and itaconic anhydride; partially esterified products of ethylenically unsaturated polyvalent carboxylic acids such as methyl maleate and methyl itaconate.

Examples of the sulfonic acid group-containing ethylenically unsaturated monomer include vinylsulfonic acid, methylvinylsulfonic acid, styrenesulfonic acid, (meth)allylsulfonic acid, ethyl (meth)acrylate-2-sulfonate, and 2-acrylamide-2-hydroxypropanesulfonic acid.

Examples of the phosphoric acid group-containing ethylenically unsaturated monomer include propyl (meth)acrylate-3-chloro-2-phosphate, ethyl (meth)acrylate-2-phosphate, and 3-allyloxy-2-hydroxypropanephosphoric acid.

These ethylenically unsaturated acid monomers can be used as alkali metal salts or ammonium salts, and can be used alone or in combination of two or more kinds. Among the above-mentioned ethylenically unsaturated acid monomers, a carboxyl group-containing ethylenically unsaturated monomer is preferable, an ethylenically unsaturated monocarboxylic acid is more preferable, and methacrylic acid can be particularly preferably used.

The content of ethylenically unsaturated acid monomer units in the copolymer constituting latex is preferably 2 to 8% by weight with respect to the total monomer units of the copolymer. By setting the content of the ethylenically unsaturated acid monomer units to the lower limit or more, the formability of the dip-formed article can be improved, and by setting the content to the upper limit or less, the texture of the dip-formed article can be improved.

The copolymer constituting the latex may contain monomer units other than ethylenically unsaturated nitrile monomer units, conjugated diene monomer units, and ethylenically unsaturated acid monomer units.

Other monomers which constitute the other monomer units are not particularly limited as long as the monomers are copolymerizable with a conjugated diene monomer, an ethylenically unsaturated nitrile monomer unit, and an ethylenically unsaturated acid monomer, and examples thereof include the following.

That is, the examples include aromatic vinyl monomers such as styrene, α-methylstyrene, monochlorostyrene, dichlorostyrene, trichlorostyrene, monomethylstyrene, dimethylstyrene, trimethylstyrene and hydroxymethylstyrene; ethylenically unsaturated carboxylic acid amide monomers such as acrylamide, methacrylamide, N,N-dimethylacrylamide, and N-methylolacrylamide; ethylenically unsaturated carboxylic acid alkyl ester monomers such as methyl (meth)acrylate, ethyl (meth)acrylate, butyl (meth)acrylate, 2-ethylhexyl (meth)acrylate; carboxylic acid vinyl ester monomers such as vinyl acetate, vinyl propionate, and vinyl versatate; vinyl halide monomers such as vinyl chloride, vinylidene chloride, vinyl fluoride, and vinylidene fluoride; olefin monomers such as ethylene, propylene, 1-butene, and isobutene; vinyl ether monomers such as methyl vinyl ether, n-propyl vinyl ether, isobutyl vinyl ether, and dodecyl vinyl ether; (meth)allyl compounds such as allyl acetate, methallyl acetate, allyl chloride, and methallyl chloride; vinylsilyl compounds such as vinyltrimethoxysilane; and vinylpyridine and N-vinylpyrrolidone. These can be used alone or in combination of two or more.

Among these, aromatic vinyl monomers are preferable in that the strength of the dip-formed article can be further enhanced. The content of the other monomer units in the copolymer constituting the latex is preferably 26% by weight or less, more preferably 10% by weight or less, still more preferably 7% by weight or less, and particularly preferably 5% by weight or less with respect to the total monomer units of the copolymer, from the viewpoint of suppressing peeling of the rubber layer from the fiber base material, from the viewpoint of suppressing fatigue during working as a glove, and further from the viewpoint of suppressing the risk of permeation of a solvent gas at the time of wearing.

The method of producing the nitrile rubber is not particularly limited, but it is preferable to prepare a copolymer rubber latex by copolymerizing the above monomers by emulsion polymerization using an emulsifier. In the present invention, this latex can be used as a latex for dip forming.

(Method of Producing Latex for Dip Forming)

The latex for dip forming used in the present invention is not particularly limited, but can be easily produced by emulsion polymerization of a mixture of the monomers described above. By adjusting the composition of the monomer mixture used for emulsion polymerization, the composition of the obtained copolymer can be easily adjusted. As the emulsion polymerization method, a conventionally known emulsion polymerization method may be adopted. In addition, in the emulsion polymerization, commonly used polymerization auxiliary materials such as emulsifiers, polymerization initiators, and molecular weight regulators can be used.

The emulsifiers are not particularly limited, and examples thereof include anionic surfactant, nonionic surfactant, cationic surfactant and amphoteric surfactant. Among these, anionic surfactants such as alkylbenzene sulfonate, aliphatic sulfonate, sulfate ester of higher alcohol, α-olefin sulfonate, alkyl ether sulfate and the like can be preferably used. The amount of the emulsifier to be used is preferably 0.5 to 1.0 part by weight and more preferably 1 to 8 parts by weight with respect to 100 parts by weight of the total monomers.

Although the polymerization initiator is not particularly limited, a radical initiator can be preferably used. Examples of such a radical initiator include inorganic peroxides such as sodium persulfate, potassium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butyl cumyl peroxide, acetyl peroxide, isobutyrylperoxide, octanoyl peroxide, dibenzoyl peroxide, 3,5,5-trimethylhexanoyl peroxide, and t-butyl peroxyisobutyrate; azo compounds such as azobisisobutyronitrile, azobis-2,4-dimethylvaleronitrile, azobiscyclohexanecarbonitrile, and azobis(isobutyric acid methyl). These polymerization initiators can be used alone or in combination of two or more. Among these radical initiators, inorganic or organic peroxides are preferable, inorganic peroxides are more preferable, and persulfates are particularly preferred. The amount of the polymerization initiator to be used is preferably 0.01 to 2 parts by weight, and more preferably 0.05 to 1.5 parts by weight with respect to 100 parts by weight of the total monomers.

The molecular weight regulator is not particularly limited, and examples thereof include α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylenethiuram disulfide, and diisopropylxanthogen disulfide. These can be used alone or in combination of two or more. Among these, mercaptans are preferable, and t-dodecyl mercaptan can be used more preferably. The amount of the molecular weight regulator to be used varies depending on the type thereof, but is preferably 0.1 to 1.5 parts by weight, and more preferably 0.2 to 1.0 part by weight with respect to 100 parts by weight of the total monomers.

Emulsion polymerization is usually carried out in water. The amount of water to be used is preferably 80 to 500 parts by weight and more preferably 100 to 200 parts by weight with respect to 100 parts by weight of the total monomers.

In the emulsion polymerization, if necessary, a polymerization auxiliary material other than the above described one may be additionally used. Examples of such polymerization auxiliary material include a chelating agent, a dispersing agent, a pH adjusting agent, a deoxidizing agent, and a particle diameter adjusting agent, and the type and amount of use thereof are not particularly limited.

The polymerization temperature is not particularly limited, but is normally 0 to 95° C. and preferably 5 to 70° C. After the polymerization reaction is stopped by adding a polymerization inhibitor, unreacted monomers are removed and the solid content concentration and the pH are adjusted as desired, and thus the latex for dip forming to be used in the present invention can be obtained. The polymerization conversion rate when the polymerization reaction is stopped is usually 80% by weight or more, and preferably 90% by weight or more.

The weight average particle diameter of copolymer particles constituting the latex for dip forming used in the present invention is usually 30 to 1000 nm, preferably 50 to 500 nm, and more preferably 70 to 200 nm. By setting the particle diameter to the lower limit or more, a phenomenon that handling of the latex becomes difficult because of excessively high viscosity can be suppressed, and, by setting the particle diameter to the upper limit or less, a phenomenon that the film formability at the time of dip forming deteriorates and it becomes difficult to obtain a dip-formed article having a uniform film thickness can be suppressed.

The total solid content concentration of the latex for dip forming used in the present invention is usually 20 to 65% by weight, preferably 30 to 60% by weight, and more preferably 35 to 55% by weight. By setting the concentration to the lower limit or more, the transport efficiency of the latex can be improved, and, by setting the concentration to the upper limit or less, a phenomenon that the production becomes difficult, and handling of the latex becomes difficult because of excessively high viscosity can be suppressed.

The pH of the latex for dip forming used in the present invention is usually 5 to 13, preferably 7 to 10, and more preferably 7.5 to 9. By setting the pH of the latex to the lower limit or higher, an inconvenience that the mechanical stability is lowered and coarse aggregates are liable to be generated at the time of transferring the latex can be suppressed, and, by setting the pH to the upper limit or lower, a phenomenon that handling of the latex becomes difficult because of excessively high viscosity can be suppressed.

Various additives such as an anti-aging agent, an antioxidant, an antiseptic, an antibacterial agent, a thickening agent, a dispersing agent, a pigment, and a dye, which are usually added to a latex, may be added, if desired, in a predetermined amount, to the latex for dip forming used in the present invention.

(Latex Composition for Dip Forming)

The dip-formed article of the present invention is obtained by performing dip forming using the fiber base material and a latex composition for dip forming containing the latex for dip forming. Here, the latex composition for dip forming is obtained by adding a crosslinking agent, a crosslinking accelerator, zinc oxide, a viscosity adjusting agent, etc. to the latex for dip forming. By adding a crosslinking agent, a composition capable of dip forming can be obtained.

As the crosslinking agent, a sulfur-based crosslinking agent is preferably used. Examples of the sulfur-based crosslinking agent include sulfur such as powdered sulfur, sulfur flower, precipitating sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azenopine-2), phosphorus-containing polysulfide, and polymer polysulfide; and sulfur-donating compounds such as tetramethylthiuram disulfide, selenium dimethyldithiocarbamate, and 2-(4'-morpholinodithio)benzothiazole. These may be used singly or in combination of plural kinds.

The amount of the sulfur-based crosslinking agent to be added is preferably 0.01 to 5 parts by weight, more preferably 0.05 to 3 parts by weight, and particularly preferably 0.1 to 2 parts by weight with respect to 100 parts by weight of the total solid content in the latex for dip forming. By setting the amount of the sulfur-based crosslinking agent to the upper limit or less, the texture of the dip-formed article can be improved. By setting the addition amount of the sulfur-based crosslinking agent to the lower limit or more, the solvent resistance of the dip-formed article can be improved.

The sulfur-based crosslinking agent is preferably added as an aqueous dispersion in which the sulfur-based crosslinking agent is dispersed in water. By adding the sulfur-based crosslinking agent as an aqueous dispersion, a dip-formed article such as a protective glove having less defects such as cracks, pinholes and adhesion of aggregates in the rubber layer can be obtained.

The method of preparing the dispersion of the sulfur-based crosslinking agent is not particularly limited, and a method in which a solvent is added to the sulfur-based crosslinking agent, and then pulverized and stirred with a wet pulverizer such as a ball mill or a bead mill is preferable.

When sulfur is used as a sulfur-based crosslinking agent, it is preferable to incorporate a crosslinking accelerator (vulcanization accelerator) or zinc oxide.

As the crosslinking accelerator (vulcanization accelerator), those commonly used in dip forming can be used.

Examples of the crosslinking accelerator include dithiocarbamic acids such as diethyldithiocarbamic acid, dibutyldithiocarbamic acid, di-2-ethylhexyldithiocarbamic acid, dicyclohexyldithiocarbamic acid, diphenyldithiocarbamic acid, and dibenzyldithiocarbamic acid and zinc salts thereof; and 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbaylthio)benzothiazole, 2-(2,6-dimethyl-4-morpholinothio)benzothiazole, 2-(4'-morpholino-dithio)benzothiazole, 4-morpholinyl-2-benzothiazyl disulfide, and 1,3-bis(2-benzothiazyl-mercaptomethyl) urea, and zinc diethyldithiocarbamate, zinc dibutyldithiocarbamate, 2-mercaptobenzothiazole, and zinc 2-mercaptobenzothiazole are preferable. These crosslinking accelerators may be used alone or in combination of two or more kinds. The amount of the crosslinking accelerator to be used is 0.1 to 10 parts by weight, preferably 0.5 to 5 parts by weight with respect to 100 parts by weight of the total solid content in the latex for dip forming.

In addition, the amount of zinc oxide to be used is 5 parts by weight or less, preferably 0.1 to 3 parts by weight, and more preferably 0.5 to 2 parts by weight with respect to 100 parts by weight of the total solid content in the latex for dip forming.

In order to adjust the viscosity of the latex composition for dip forming to a desired range, it is preferable that a viscosity adjusting agent is included. Examples of the viscosity adjusting agent include a carboxymethyl cellulose-based thickening agent, a polycarboxylic acid-based thickening agent, and a polysaccharide-based thickening agent. In addition, the viscosity of the latex composition for dip forming is preferably set to 500 to 8,000 mPa·s, and more preferably 2,500 to 7,000 mPa·s.

Various additives such as an anti-aging agent, an antioxidant, an antiseptic, an antibacterial agent, a wetting agent, a dispersing agent, a pigment, a dye, a filler, a reinforcing material, and a pH adjusting agent may be added, if necessary, in a predetermined amount, to the latex composition for dip forming.

The solid content concentration of the latex composition for dip forming is preferably 5 to 40% by weight, and more preferably 10 to 25% by weight. In addition, the surface tension of the latex composition for dip forming is preferably 25 to 40 mN/m.

(Aging)

In the present invention, the latex composition for dip forming is subjected to aging (also referred to as pre-vulcanization) before being subjected to dip forming. The temperature condition for aging is preferably 20 to 50° C. In addition, the time for aging is preferably 4 hours or more and 120 hours or less, and more preferably 24 hours or more and 72 hours or less, from the viewpoint of suppressing separation of the rubber layer from the fiber base material and suppressing permeability of the solvent gas. When the aging time is within the above range, a phenomenon that the penetration of the rubber constituting the rubber layer into the fiber base material becomes insufficient in the obtained dip-formed article can be suppressed, and a phenomenon that the rubber penetrates into the fiber base material too much can be suppressed. In addition, when the aging time is in the above range, a phenomenon that the solvent gas becomes more likely to permeate through the obtained dip-formed article, and as a result, it becomes difficult to suppress the risk of permeation of the solvent gas when wearing the protective glove as the dip-formed article can be suppressed.

(Dip-Formed Article)

The dip-formed article of the present invention is obtained by performing dip forming of the latex composition for dip forming described above. As a dip forming method, a conventionally known method can be adopted, and examples thereof include a direct dipping method, an anode coagulant dipping method, and a Teague coagulant dipping method. Among these, the anode coagulant dipping method is preferable in that a dip-formed article having a uniform thickness can be easily obtained. Hereinafter, a dip forming method by an anode coagulant dipping method as one embodiment will be described.

First, a dip forming mold covered with a fiber base material is immersed in a coagulating agent solution to let the coagulating agent attach to the surface of the dip forming mold.

As the dip forming mold, various materials such as porcelain, glass, metal, and plastic can be used. The shape of the mold may be adapted to the shape of the dip-formed article as a final product. For example, when the dip-formed article is a glove, various shapes such as a shape from the wrist to the fingertip, and a shape from the elbow to the fingertip can be adopted as the shape of the dip forming mold. In addition, the surface of the dip forming mold may be entirely or partially subjected to surface processing such as gloss processing, semi-gloss processing, non-gloss processing, and weaving pattern processing.

The coagulating agent solution is a solution in which a coagulating agent capable of coagulating latex particles is dissolved in water, alcohol or a mixture thereof. Examples of the coagulating agent include metal halide salts, nitrates, and sulfates.

Next, the dip forming mold to which the coagulating agent has been attached is immersed in the latex composition for dip forming, and then the dip forming mold is pulled up to form a rubber layer as a dip-formed layer on the surface of the fiber base material. The time for immersing the dip forming mold in the latex composition for dip forming is preferably 1 to 120 seconds.

After that, the rubber layer as the dip-formed layer formed on the dip forming mold is heated to crosslink the copolymer constituting the dip-formed layer.

The heating temperature for crosslinking is preferably 60 to 160° C., and more preferably 80 to 150° C. By setting the heating temperature to the lower limit or higher, the time required for the crosslinking reaction is a predetermined time, and thus the productivity can be improved. In addition, by setting the heating temperature to the upper limit or lower, oxidative degradation of the copolymer is suppressed, and thus the physical properties of the formed article can be improved. The time of the heat treatment may be appropriately selected according to the heat treatment temperature, but is usually 5 to 120 minutes.

In the present invention, before performing heat treatment on the dip-formed layer, the dip-formed layer is preferably immersed in warm water at 20 to 80° C. for about 0.5 to 60 minutes to remove water-soluble impurities (emulsifier, water-soluble polymer, coagulating agent, etc.).

Subsequently, the fiber base material including the dip-formed layer crosslinked by heat treatment is detached from the dip forming mold to obtain the dip-formed article.

After the dip-formed article is detached from the dip forming mold, heat treatment (post-crosslinking step) may be further performed at a temperature of 60 to 120° C. for 10 to 120 minutes. Further, a surface treatment layer may be formed on the inner and/or outer surfaces of the dip-formed article by chlorination treatment, coating treatment, or the like.

The thickness of the rubber layer in the dip-formed article of the present invention is 0.2 to 0.8 mm, and preferably 0.2 to 0.4 mm.

In addition, in the dip-formed article of the present invention, the rubber contained in the rubber layer penetrates into the fiber base material, and the maximum depth to which the rubber penetrates into the fiber base material is 0.1 to 0.3 mm. If this maximum depth is too large, the stress of the dip-formed article in which the rubber layer is laminated increases, and it becomes difficult to suppress fatigue in working when used as a glove. In addition, if the maximum depth is too small, there is a possibility that the rubber layer is peeled off from the fiber base material.

Also, it is preferable that there is no crack in the rubber layer of the dip-formed article of the present invention. Here, "there is no crack" means that the size, depth, and ranking of the crack when evaluated by the method described in "Annex 1 (normative) Crack Evaluation Method" of JIS K6259 is 1 (which cannot be seen with the naked eye but can be recognized with a 10× magnifying glass). Note that, a case where a crack that cannot be recognized with the naked eye or even with a 10× magnifying glass exists is also included in the case of "no crack" of the present invention.

In addition, in the dip-formed article of the present invention, the maximum stress at 50% elongation of the laminate is 20 N or smaller. If this maximum stress is too large, it becomes difficult to suppress fatigue during working when the dip-formed article is used as a glove. Note that, the lower limit of the maximum stress is not particularly limited, but is usually about 1.0 N.

The dip-formed article of the present invention can suppress peeling of a rubber layer from a fiber base material, can suppress fatigue during working, and can suppress the risk of permeation of a solvent gas at the time of wearing. Therefore, the dip-formed article of the present invention can be suitably used for working gloves, particularly protective gloves for domestic, agricultural, fishery, and industrial use and the like.

EXAMPLES

Hereinafter, the present invention will be specifically described with reference to Examples and Comparative Examples. In these examples, "parts" and "%" are on a weight basis unless otherwise specified. However, the present invention is not limited to only these examples.

Evaluations in Examples and Comparative Examples were carried out as follows.

<Method of Measuring Viscosity of Latex Composition for Dip Forming>

The viscosities of latex compositions for dip forming prepared in Examples and Comparative Examples were measured with a B-type viscometer (manufactured by Brookfield) using a rotor No. 3 at a temperature of 25° C. and a rotation speed of 6 rpm.

<Thickness of Rubber Layer and Method of Measuring Maximum Depth of Rubber Penetrating into Fiber Base Material>

With respect to protective gloves produced in Examples and Comparative Examples, the thickness of the rubber layer and the maximum depth to which the rubber penetrated into the fiber base material were measured with an optical microscope.

Specifically, a cross section of a rubber layer laminated on a palm portion at 12 cm from the tip of the middle finger of a protective glove as a sample was observed using an optical microscope (VHX-200, manufactured by Keyence Corporation).

As shown in FIG. 1, the thickness of the rubber layer was obtained by measuring the distance from the highest portion of the fiber base material constituting the laminate to the top surface of the laminated rubber layer at ten points and calculating the number average value. In addition, the maximum depth to which the rubber penetrated was determined by measuring the distance from the highest portion of the fiber base material to the deepest part of the rubber that penetrated at ten points and calculating the number average value. The results of measurement are shown in Table 1.

<Crack in Portion Where Rubber Layer Was Laminated>

Evaluation of cracks in a portion where the rubber layer was laminated was performed in accordance with the standard of evaluation described in "size, depth, and ranking of cracks" described in Table 1 (crack state) of "Annex 1 (normative) Crack Evaluation Method" of JIS K6259. That is, the state of cracks on the surfaces of the protective gloves produced in Examples and Comparative Examples was ranked. The results are shown in Table 1.

<Stress at 50% Elongation of Laminate>

The stress at 50% elongation of the laminate was measured by the following procedure. First, dumbbell-shaped test pieces of the protective gloves produced in Examples and Comparative Examples were prepared by using a dumbbell (Die-C: manufactured by Dumbbell Co., Ltd.) in accordance with ASTM D-412. Next, these test pieces were pulled at a pulling rate of 500 mm/min using a universal testing machine (3343: manufactured by INSTRON) and the stress at 50% elongation was measured. The results are shown in Table 1.

<Solvent Gas Permeability>

Solvent gas permeability was measured by the following procedure with reference to a cup method described in JIS Z 0208.

(1) The protective gloves produced in Examples and Comparative Examples were cut into circular suitable sizes to prepare samples.

(2) The weight (W1) of an aluminum cup and the sample was measured.

(3) 50 mL of n-hexane was placed in the aluminum cup.

(4) The sample (dip-formed article) was placed on the aluminum cup containing n-hexane such that the rubber layer of the sample is in contact with the liquid.

(5) The aluminum cup and the sample were brought into tight contact by using a fixing tool.

(6) The weight (W2) of the entire aluminum cup was measured.

(7) In order to let n-hexane be in contact with the sample, the aluminum cup was turned over and left in a fume hood at room temperature.

(8) After leaving the aluminum cup for 72 hours, the weight (W3) of the entire aluminum cup was measured.

(9) The proportion (solvent gas permeability) at which n-hexane permeated through the sample and was evaporated was calculated by the following equation.

$$\text{Solvent gas permeability (\%)}=100-((W3-W1)(W2-W1)\times 100)$$

The results are shown in Table 1. It is indicated that the smaller the value of the solvent gas permeability is, the harder it becomes for the solvent gas to permeate, and the risk of permeation of the solvent gas at the time of wearing can be suppressed.

<Peeling of Rubber Layer>

Evaluation of peeling of the rubber layer was performed by determining whether or not only the rubber layer was peeled off when the rubber layer was peeled off from the fiber base material by pinching an end of the rubber layer of the protective glove manufactured in Examples and Comparative Examples. The results are shown in Table 1.

<Degree of Fatigue During Wearing>

Evaluation of a degree of fatigue during wearing was carried out by questioning the feeling of fatigue felt in the hands after actually wearing the protective gloves manufactured in Examples and the Comparative Examples on hands and carrying out light work such as cleaning and transportation. The evaluation was performed with ten people, and the number of people who felt fatigue during wearing was counted. The results are shown in Table 1.

Example 1

(Preparation of Compound Dispersion)

A sulfur dispersion having a solid content concentration of 50% by weight was obtained by grinding and stirring 1.0 part of colloidal sulfur (manufactured by Hosoi Chemical Industry Co., Ltd.), 0.5 parts of a dispersing agent (DEMOL N manufactured by Kao Corporation), 0.0015 parts of 5% potassium hydroxide (manufactured by Wako Pure Chemical Industries, Ltd.), and 1.0 part of water in a ball mill for 48 hours.

Aqueous dispersions in which zinc dibutyldithiocarbamate (manufactured by Ouchi Shinko Chemical Industrial Co., Ltd., hereinafter referred to as "ZnDBC" in some cases) and zinc oxide (manufactured by Seido Chemical Industry Co., Ltd.) were used instead of the colloidal sulfur were prepared in the same manner.

(Preparation of Latex Composition for Dip Forming)

A 10% ammonia aqueous solution was added to a latex for dip forming (Nipol LX560 (Zeon Corporation) to adjust the pH to 9.5. In addition, aqueous dispersions of respective compounding agents were added thereto such that the content of colloidal sulfur (added as the above-mentioned sulfur dispersion liquid) was 1.0 part, the content of ZnDBC was 0.5 parts, and the content of zinc oxide was 2.0 parts in terms of solid content with respect to 100 parts of the copolymer in the latex for dip forming. Note that, at the time of addition, while stirring the latex, a predetermined amount of the aqueous dispersion of each compounding agent was gradually added. After uniformly mixing the additives, Aron (manufactured by Toagosei Co., Ltd.) was added as a viscosity adjusting agent to adjust the viscosity of the composition to 4,000 mPa·s, and thus a latex composition for dip forming was obtained.

In addition, the latex composition for dip forming was used after being subjected to aging (also referred to as pre-vulcanization) before being subjected to dip forming. The temperature condition for aging was 30° C. Also, the time for aging was 48 hours.

(Production of Dip-Formed Article (Protective Glove))

Using the above latex composition for dip forming, a dip-formed article (protective glove) was produced by the following method.

First, a ceramic glove mold covered with a fiber glove (material: nylon, linear density: 300 deniers, gauge number: 13 gauge, thickness: 0.8 mm) was immersed in a coagulating agent solution consisting of a 5% calcium nitrate methanol solution for 10 seconds, pulled up, and then dried at 30° C. for 1 minute to cause the coagulating agent to attach to the fiber glove. Subsequently, the glove mold to which the coagulating agent has been attached was immersed in the above latex composition for dip forming for 20 seconds, pulled up, dried at 30° C. for 10 minutes, and then dried at 70° C. for 10 minutes. Thereafter, the glove mold was immersed in warm water of 60° C. for 90 seconds to elute water-soluble impurities, and then dried again at 30° C. for 10 minutes. The dip-formed layer was subjected to cross-linking treatment by performing heat treatment at 125° C. for 30 minutes.

Next, the crosslinked dip-formed article was detached from the glove mold to obtain a rubber glove laminated on the fiber glove.

Example 2

A dip-formed article (protective glove) was produced in the same manner as in Example 1 except that the time for aging the latex composition for dip forming was changed to 72 hours.

Comparative Example 1

A dip-formed article (protective glove) was produced in the same manner as in Example 1 except that the time for aging the latex composition for dip forming was changed to 2 hours.

Comparative Example 2

A dip-formed article (protective glove) was produced in the same manner as in Example 1 except that the viscosity of the composition was adjusted to 10,000 mPa·s and the immersing time in the latex composition for dip forming was changed from 20 seconds to 10 seconds.

Comparative Example 3

A dip-formed article (protective glove) was produced in the same manner as in Example 1 except that the time for aging the latex composition for dip forming was changed to 130 hours.

TABLE 1

|  |  | Unit | Ex. 1 | Ex. 2 | Comp. Ex. 1 | Comp. Ex. 2 | Comp. Ex. 3 |
|---|---|---|---|---|---|---|---|
| Protective glove | Thickness of rubber layer | mm | 0.223 | 0.336 | 0.638 | 0.832 | 0.236 |
|  | Maximum depth of rubber penetrated into fiber base material | mm | 0.212 | 0.184 | 0.389 | 0.205 | 0.032 |
|  | Cracks in portion on which rubber layer is laminated | Class | 1 | 1 | 1 | 2 | 1 |
| Items of evaluation | Stress at 50% elongation of laminate | N | 10.3 | 14.7 | 32 | 38 | 9.8 |
|  | Solvent gas permeability | % | 2.4 | 2.1 | 1.2 | 8.2 | 5.8 |
|  | Peeling of rubber layer | — | Not peeled | Not peeled | Not peeled | Not peeled | Peeled |
|  | Fatigue during wearing (number of persons who felt fatigue during wearing) | Persons | 0 | 1 | 5 | 7 | 0 |
|  | Note |  | — | — | Too much penetration into the fiber base material increases the stress and causes fatigue. | The rubber layer is thick, cracks occur, the solvent gas permeability is bad, and fatigue is caused. | The maximum depth is small and peeling occurs. Further, the solvent gas permeability is bad. |

As shown in Table 1, it was found that a protective glove in which the thickness of the rubber layer was 0.2 to 0.8 mm, the maximum depth to which the rubber penetrated into the fiber base material was 0.1 to 0.3 mm, the rubber layer had no crack, the maximum stress at 50% elongation of a laminate was 20 N or smaller could suppress peeling of the rubber layer from the fiber base material, suppress fatigue during working, and further suppress the risk of permeation of solvent gas at the time of wearing (Examples 1 and 2).

In contrast, in the case where the maximum depth to which the rubber penetrated into the fiber base material was large, fatigue during working could not be suppressed (Comparative Example 1).

In addition, a protective glove in which the thickness of the rubber layer was large, the rubber layer had cracks, and the maximum stress at 50% elongation of the laminate was larger than 20 N could not suppress the risk of permeation of the solvent gas at the time of wearing, and could not suppress fatigue during working (Comparative Example 2).

In addition, it was found that, in the case where the maximum depth to which the rubber penetrated into the fiber base material was small, peeling of the rubber layer from the fiber base material could not be suppressed, and the risk of permeation of the solvent gas at the time of wearing could not be suppressed (Comparative Example 3).

The invention claimed is:

1. A dip-formed article comprising a laminate in which a rubber layer is laminated on a fiber base material, wherein:
   the dip-formed article is obtained by immersing a dip forming mold covered with the fiber base material in a coagulating agent solution to let a coagulating agent attach to a surface of the dip forming mold, followed by immersing the dip forming mold to which the coagulating agent has been attached in a latex composition for dip forming having a viscosity of 500 to 8,000 mPa·s, the latex composition comprising a viscosity adjusting agent and a rubber that constitutes the rubber layer,
   a thickness of the fiber base material is in a range of from 0.1 to 2 mm,
   a thickness of the rubber layer is in a range of from 0.2 to 0.8 mm,
   the rubber constituting the rubber layer penetrates into the fiber base material,
   a maximum depth of the rubber penetrated into the fiber base material is in a range of from 0.1 to 0.3 mm, and
   a maximum stress at 50% elongation of the laminate is 20 N or smaller.

2. The dip-formed article according to claim 1, wherein the rubber layer has no crack.

3. The dip-formed article according to claim 1, wherein the rubber layer includes nitrile rubber.

4. A protective glove using the dip-formed article according to claim 1.

5. The dip-formed article according to claim 1, wherein the maximum depth of the rubber penetrated into the fiber base material is in a range of from 0.184 mm to 0.3 mm.

6. The dip-formed article according to claim 1, wherein the maximum depth of the rubber penetrated into the fiber base material is in a range of from 0.184 mm to 0.212 mm.

7. The dip-formed article according to claim 1, wherein the latex composition for obtaining the dip-formed article is subjected to aging for a duration of 4 to 120 hours before being subjected to dip forming.

* * * * *